United States Patent [19]
Labes

[11] Patent Number: 5,158,364
[45] Date of Patent: Oct. 27, 1992

[54] METHOD OF MAKING AND USING AN IMPROVED LIQUID CRYSTAL CUMULATIVE DOSIMETER CONTAINER

[75] Inventor: Mortimer M. Labes, Philadelphia, Pa.

[73] Assignee: Temple University, Philadelphia, Pa.

[21] Appl. No.: 815,111

[22] Filed: Dec. 27, 1991

Related U.S. Application Data

[62] Division of Ser. No. 633,269, Dec. 21, 1990, Pat. No. 5,110,215.

[51] Int. Cl.$^5$ ............................................. G01K 11/08
[52] U.S. Cl. .................................... 374/106; 116/218; 374/162; 426/88
[58] Field of Search ............... 374/106, 160, 161, 162, 374/102; 116/218, 219

[56] References Cited

U.S. PATENT DOCUMENTS

| | | |
|---|---|---|
| 2,717,601 | 9/1955 | Brown . |
| 2,764,157 | 9/1956 | Olivia et al. . |
| 2,800,457 | 7/1957 | Green et al. . |
| 3,036,819 | 5/1962 | Peterson . |
| 3,149,943 | 9/1964 | Amador . |
| 3,341,466 | 9/1967 | Brynko et al. . |
| 3,539,794 | 11/1970 | Rauhut et al. . |
| 3,804,593 | 4/1974 | Smythe . |
| 3,967,579 | 7/1976 | Seiter . |
| 4,066,567 | 1/1978 | Labes . |
| 4,140,016 | 2/1979 | Ferguson . |
| 4,289,233 | 9/1981 | Firth . |
| 4,296,631 | 10/1981 | Ferguson . |
| 4,385,844 | 5/1983 | Ferguson . |
| 4,391,931 | 7/1983 | Haigh et al. . |
| 4,402,402 | 9/1983 | Pike . |
| 4,458,811 | 7/1984 | Wilkinson . |
| 4,469,452 | 9/1984 | Sharpless et al. . |
| 4,533,640 | 8/1985 | Shafer . |
| 4,632,244 | 12/1986 | Landeau . |
| 4,708,812 | 11/1987 | Hatfield . |
| 4,729,671 | 3/1988 | Asano et al. ............... 116/219 X |
| 4,805,767 | 2/1989 | Newman . |
| 4,859,360 | 8/1989 | Suzuki et al. ............... 374/162 X |

*Primary Examiner*—Daniel M. Yasich
*Attorney, Agent, or Firm*—Ratner & Prestia

[57] ABSTRACT

A method of making and using a liquid crystal cumulative dosimeter container including a resilient outer body sealed to confine a first liquid crystal composition constituent and a second liquid crystal composition constituent and having at least one transparent section to permit observation of the color of the confined composition, and a barrier contained completely within and physically unattached to the outer body for separating the first constituent from the second constituent, whereby disruption of the barrier allows the first constituent to mix with the seocnd constituent. The barrier is formed either by encapsulating one or both of the constituents or by using air bubbles.

11 Claims, 2 Drawing Sheets

METHOD OF MAKING AND USING AN IMPROVED LIQUID CRYSTAL CUMULATIVE DOSIMETER CONTAINER

This application is a division of application Ser. No. 07/633,269 filed Dec. 21, 1990, now U.S. Pat. No.

FIELD OF THE INVENTION

This invention relates to a method of making and using a container for packaging a cumulative dosimeter which uses liquid crystal compositions. More particularly, the container separately stores the two reactive liquid crystal composition constituents, which form the dosimeter, either by encapsulating one or both of the constituents or by using air bubbles. To activate the dosimeter, the container allows the constituents to be mixed.

BACKGROUND OF THE INVENTION

The successful storage of perishable packaged foods, pharmaceuticals, and other consumable goods often depends upon the duration and temperature of storage. The useful life of such goods, their shelf life, can be reduced significantly if storage occurs at temperatures higher than those recommended. Despite precautions, a number of sources may inadvertently cause high temperatures: power outages, equipment breakdowns, inaccurate thermostats, warm sections in refrigeration units, unaccountable removal and replacement of the goods, and the like.

Such vagaries prompt the use of expiration dates, which are usually conservative estimates of shelf life and which risk premature disposal of useful goods. These uncertainties also risk use of deteriorated goods. To avoid such risks, devices that indicate whether perishable goods have accumulated a deleterious amount of thermal exposure prove useful.

Many devices and materials have been developed to indicate, by reflecting the accumulated time of storage at a predetermined temperature, expiration of shelf life. Also known in the art are cumulative dosimeters which reflect the combination of time and temperature of storage. Cholesteric liquid crystals broadly useful in the practice of the present invention comprise cholesteric compositions such as those described in U.S. Pat. No. 4,066,567, issued to Mortimer M. Labes and incorporated herein by reference.

Briefly, these compositions include a cholesteric liquid crystal compound with one or more of the constituents of the composition adapted to enter into a chemical reaction. The rate of that reaction is proportional to both the time and temperature of exposure in a cumulative manner. The light reflecting properties of the composition change in proportion to the degree of completeness of the reaction, usually causing the composition to change color. An extraneous material, such as a solute or diluent, may be added to affect the color of the liquid crystals. Thus, the compositions show a color change exhibiting, for example, that the composition has been exposed to a temperature in the range of 0°–25° C. for a period of several hours.

The two (or occasionally more) constituents of the compositions which will react chemically must be separately stored before use. Separate storage within the closed system of the cumulative dosimeter container is necessary to prolong the shelf life of the dosimeter. Consequently, it is also necessary to provide a quick and convenient way to mix the constituents in the closed system when the dosimeter is to be used.

A number of flexible containers have been devised, in various configurations, to permit separate storage and convenient mixing. Typically, these containers have multiple chambers or compartments separated by rupturable or frangible barriers. U.S. Pat. No. 4,469,452 issued to Sharpless et al., for example, discloses a cholesteric liquid crystal system which has a temperature sensitive membrane located between the constituents. The membrane prevents mixing until the correct temperature is reached, after which the reaction starts.

Another reference (U.S. Pat. No. 4,533,640 issued to Shafer) shows an accumulated thermal exposure device which includes an inner tube filled with one constituent reactant and an outer tube filled with a second constituent reactant. The reactants mix to form an amine and an indicator is included. One embodiment specifically shows a reactant package which has a well of one material and a plug of another separated by a frangible barrier. Upon application of pressure, the two reactants are allowed to mix and, if the temperature is correct, to react.

The Sharpless et al. and Shafer references are typical of the prior art containers. Each shows an accumulated thermal exposure device with structural barriers physically attached to the container for separating two components. The device is activated upon removal of the barrier, either when the correct thermal conditions are attained or by application of mechanical pressure.

Containers which have a frangible barrier have several drawbacks. For many containers of this type, the user must mechanically break or rupture the barrier. That action requires great care, because the user must avoid damage to the container itself. The act of breaking the barrier without damaging the container is especially difficult when the barrier is physically attached to the container; the point at which the barrier breaks must be controlled.

In most, if not all, of the containers using a frangible barrier, the strength of the barrier and, therefore, the force needed to break it, depend, in substantial part, upon the physical characteristics of the barrier material. Thus, the physical specifications of the barrier must be controlled precisely, a requirement which increases the cost of the container. Moreover, the relatively complex structure of such frangible barriers increases the cost of manufacture.

To overcome the shortcomings of existing liquid crystal cumulative dosimeter containers, a new container is provided. An object of the present invention is to provide a container which separates the reactants until mixing is desired and which achieves separation with a barrier that is both economical to manufacture and easy to use. A related object is to avoid the need for structural barriers which are physically attached to the container. Another object is to incorporate a barrier which provides good seal integrity, preventing premature mixing, yet minimizes the chances of inadvertent rupture. It is still another object of the present invention to permit activation without damage to the container itself.

SUMMARY OF THE INVENTION

To achieve these and other objects, and in view of its purposes, the present invention provides a container for a liquid crystal cumulative dosimeter which is sealed to contain a cholesteric liquid crystal composition with one or more of the constituents of the composition adapted to enter into a chemical indicating reaction. Because the composition changes color in proportion to the degree of completeness of the reaction, the container has at least one transparent section to permit observation of the color change.

A barrier is contained completely within, but is physically unattached to, the container. That barrier separates the reactants within the container while the dosimeter is stored. When the user wants to activate the dosimeter, the barrier is disrupted so that the reactants can mix and, thereby, react.

In a specific embodiment of the invention, the barrier includes a separating air bubble disposed between the reactants and a ballast air bubble disposed behind one or both of the reactants. To mix the reactants and activate the dosimeter in an indicating reaction, the user displaces the separating air bubble, causing it to "join" the ballast air bubble. Such displacement may be accomplished either mechanically or thermally. A unique advantage of this embodiment is the lack of any structural barrier that is ruptured, broken, or permeated inside the container. The barrier is opened simply by pushing or kneading the separating air bubble or by cooling sharply one side of the container.

Another aspect of the invention is the novel methods of manufacturing the above-described container. Briefly, one method includes the steps of (a) providing a resilient sealable enclosure separated into a lower half and an upper half; (b) placing a predetermined amount of one reactant on the lower half of the enclosure at a specified position thereon; (c) placing a predetermined amount of the second reactant on the lower half of the enclosure at a specified distance from the first reactant; (d) covering the lower half of the enclosure with the upper half of the enclosure; and (e) sealing the lower half of the enclosure to the upper half of the enclosure so that the specified distance between the first and second reactants defines the size of the separating air bubble between the reactants and the ballast bubble forms behind at least one of the reactants between the reactant and a wall of the enclosure.

This method can be implemented on a mass production basis, and requires little precise machining. In addition, the method allows the amount of the reactants used to be precisely controlled. The result is a highly efficient, economical manufacturing process.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing, in which.

DETAILED DESCRIPTION OF THE INVENTION

1. The Container of FIGS. 1-7

FIGS. 1-6 and 7 show two barrier embodiments of a container 10, 10A, 10B, 10C, 10D, 10E, and 10F for a liquid crystal cumulative dosimeter constructed in accordance with the present invention. The container 10, 10A, 10B, 10C, 10D, 10E, and 10F defines an outer body 12, 12A, 12B, 12C, 12D, 12E, 12F which may have a variety of shapes. Whatever its shape, the outer body confines a first composition constituent 14, 14A, 14B, 14C, 14D, 14E, 14F and a second composition constituent 16, 16A, 16B, 16C, 16D, 16E, 16F. The first constituent and second constituent combine to form a composition based on cholesteric liquid crystals as described in U.S. Pat. No. 4,066,567. To confine the constituents, the outer body of the container is sealed.

The first constituent and second constituent are adapted to enter into a chemical reaction, described more fully in the reference cited above. The rate of that reaction is proportional to the exposure of the composition to both time and temperature. The light reflecting properties of the composition change in proportion to the degree of completeness of the reaction, usually causing the composition to change color. An extraneous material, such as a solute or diluent, may be added to affect the color of the liquid crystals.

In a typical application of the composition, perishable goods may be packaged with the container of the present invention confining a cholesteric liquid crystal including chemical constituents which react at a reasonable rate only at temperatures greater than 25° C. but which react at slower rates at temperatures up to 25° C. The cholesteric is blended so that its normal color is, for example, red at temperatures between 0° C. and 25° C. with a shift in color brought about by reaction of the constituents to blue, for example. The proposed storage temperature of the goods is 0° C. or below. At that temperature, the reaction rate of the constituents is substantially zero. Further, the constituent reaction is controlled by the concentration of the constituents so that the reaction will be substantially complete within a range of exposure of from 5° C. for 100 to 1,000 hours to 25° C. for 1 to 100 hours.

Figure 5A:
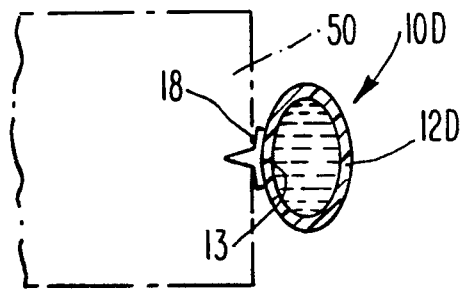
FIG. 5A illustrates a cross-section of the container shown in FIG. 5 taken along line A—A of FIG. 5 and highlights the tack-shaped section included on the container to affix the container to the goods it will monitor.
Figure 5:
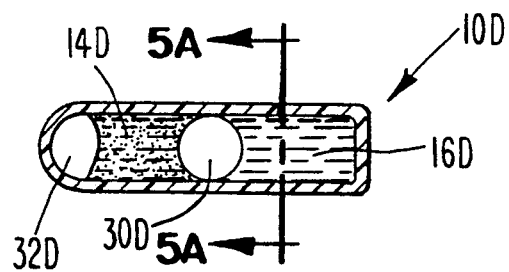
FIG. 5 shows a container in which the outer body of the container has a tube configuration and the reactive constituents are separated by the barrier embodiment of FIGS. 1-4.
Figure 6:
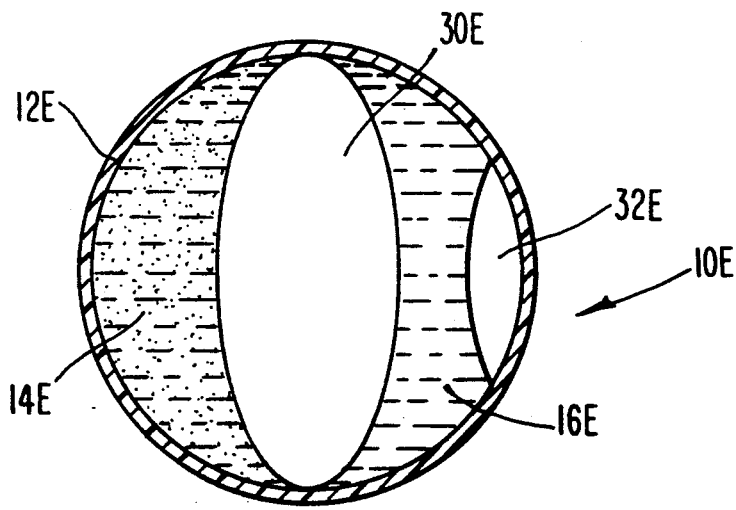
FIG. 6 shows a container in which the outer body of the container is a relatively flat sheet and the reactive constituents are separated by the barrier embodiment of FIGS. 1-5 and 5A.

Container 10, 10A, 10B, 10C, 10D, 10E, 10F may be packaged with the goods so it will monitor for temperature dosage in a number of ways. The container may be mounted on the surface of the goods at the base 13 of the container. The container may also include a section 18 affixed to base 13 (as shown in FIG. 5A, which is a cross-section taken along the line A—A in FIG. 5). Section 18 is composed of a material capable of efficient heat transfer and is shaped, for example, like a tack to assure enhanced thermal contact between the container and the goods. Such a section permits the container to better sense the inner cumulative temperature exposure of the goods.

Figure 1:
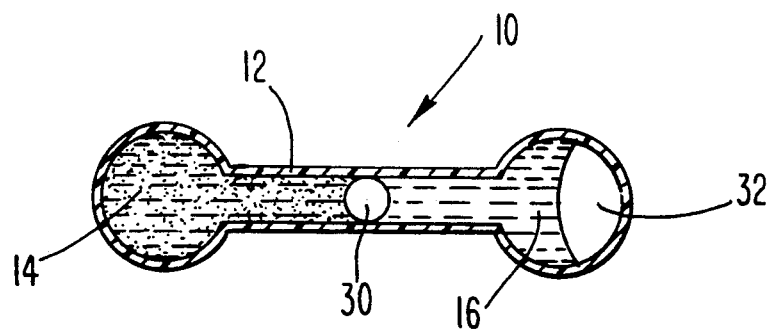
FIG. 1 shows a container in which the outer body of the container has a "dumbbell" configuration and the reactive constituents are separated by one embodiment of the barrier which includes a separating air bubble disposed between the constituents and a ballast air bubble disposed behind one of the constituents.
Figure 2:
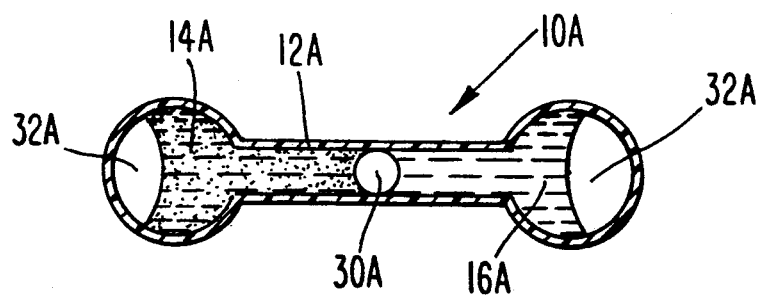
FIG. 2 shows a container in which the outer body of the container has a "dumbbell" configuration and the reactive constituents are separated by the barrier embodiment of FIG. 1, highlighting that a ballast air bubble may be disposed behind each of the constituents.
Figure 3:
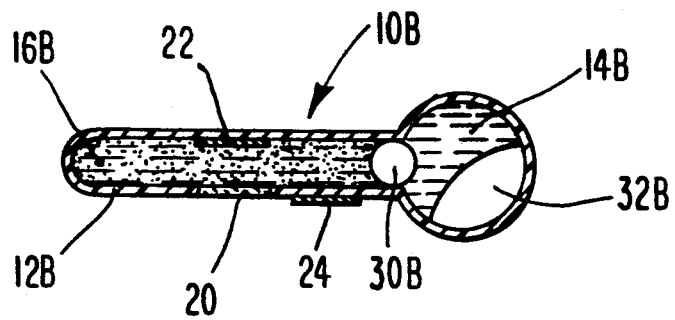
FIG. 3 shows a container in which the outer body of the container has a ball-and-plunger configuration and includes a transparent section, a reflective section, and a color indicator to facilitate observation and the reactive constituents are separated by the barrier embodiment of FIGS. 1 and 2, highlighting the variation possible in location of the air bubbles.
Figure 4:
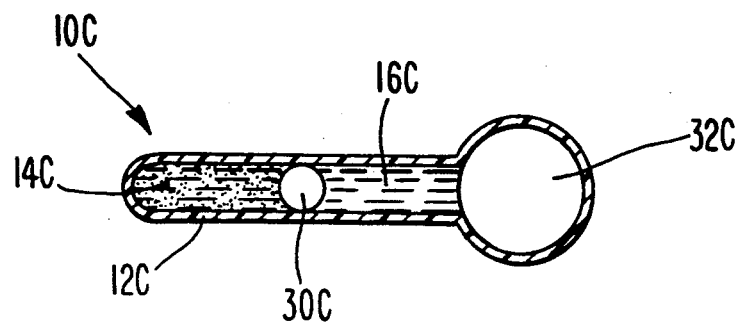
FIG. 4 shows a container in which the outer body of the container has a ball-and-plunger configuration and the reactive constituents are separated by the barrier embodiment of FIGS. 1-3, highlighting the variation possible in size and position of the ballast air bubble.

In order to facilitate observation of the color of the composition confined within the container, the outer body is provided with at least one transparent section 20 (see FIG. 3). Multiple transparent sections may be provided and, of course, the entire outer body might be made of a transparent material. To further facilitate observation, a reflective section 22, typically blackened, is provided on the outer body. Preferably, reflective section 22 is positioned opposite transparent section 20, as shown in FIG. 3. The entire lower half of the outer body, the half opposite the observer, could constitute a reflective section 22.

To help the user evaluate the observed color, a color indicator 24 may be provided either in or on the outer body. Indicator 24 contains indicia which allow the user to compare the observed color of the composition inside the container with typical colors exhibited by that composition and to form a color match. Further indicia inform the user of the cumulative thermal dosage corresponding to the matched color. Placement of transparent section 20, reflective section 22, and color indicator 24 on the outer body can vary depending on the application for which the container is used.

Outer body 12, 12A, 12B, 12C, 12D, 12E, 12F is made of a resilient material, preferably a thermoplastic material selected for hydrolytic stability and biological inertness. Suitable materials include polypropylene, polyethylene, polyesters, polyacrylates, certain nylons, and the like. The thickness of outer body 12, 12A, 12B, 12C, 12D, 12E, 12F is typically about 15 microns. Various shapes for outer body 12, 12A, 12B, 12C, 12D, 12E, 12F are possible, some of which are distinguished in FIGS. 1, 3, 5, and 7. Possible shapes include a ball-and-plunger (see FIG. 3), a tube (see FIG. 5), a relatively flat sheet (see FIGS. 6 and 7), and the like. Using the example of FIG. 1, a "dumbbell" configuration is shown. Two circular end sections, each with a diameter of about 5 mm, are connected by a bridge. The bridge is a tube about 7 mm long with a diameter of about 1 mm.

Disposed completely within the interior of the outer body is a barrier for separating the first constituent from the second constituent during storage of the container. Although the barrier may contact or touch the inner wall of the outer body, it is not physically attached in any way to the outer body. Two, alternative embodiments are provided for the barrier—both of which avoid the known use of structural barriers which are physically attached to the container and the consequent drawbacks of such containers discussed above.

In the first embodiment, encapsulation is used to enclose one or both of the composition constituents, thereby providing a barrier separating the constituents. The process of encapsulation is well known, as disclosed, for example, in U.S. Pat. No. 3,341,466 issued to Brynko et al. The thickness of the capsule or microcapsules is chosen to perform two functions: it must confine the constituent or constituents without leakage during the storage and it must break under mechanical application of modest pressure when activation of the dosimeter is desired.

An example best explains the meaning of "modest pressure." In a typical application of the present invention, the container will be used to monitor the cumulative thermal dosage of perishable grocery goods. It may be desirable to activate the dosimeter when such goods are labeled in a labelling machine. Accordingly, the relatively modest pressure mechanically applied by the rollers of the labelling machine should be sufficient to break the capsule or microcapsules and allow the constituents to mix and react. Thicknesses on the order of a few microns are suitable for this purpose.

Figure 7:
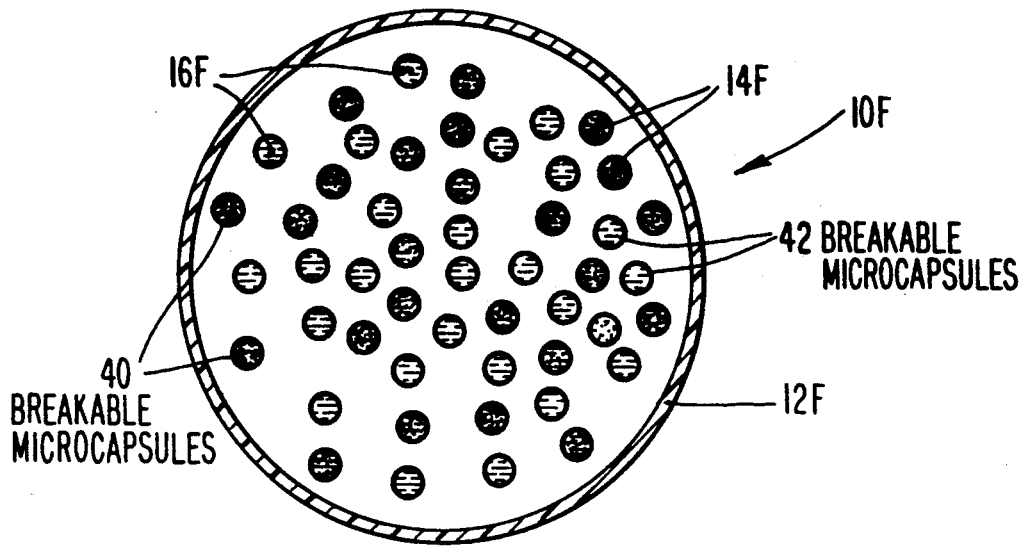
FIG. 7 shows a container in which the outer body is a relatively flat sheet and the reactive constituents are separated by another embodiment of the barrier which includes encapsulation of the separate constituents.

The first embodiment, encapsulation, is best illustrated in FIG. 7. Microcapsule 40 encapsulates first constituent 14F and microcapsule 42 encapsulates second constituent 16F. Microcapsules 40 and 42 may be randomly distributed throughout outer body 12F so that, when microcapsules 40 and 42 are broken, constituents 14F and 16F will, upon release, be intermixed and can react.

A second embodiment for the barrier is shown in FIGS. 1-6. Disposed in the interior of outer body 12, 12A, 12B, 12C, 12D, 12E, is an air bubble 30, 30A, 30B, 30C, 30D, and 30E. Formation and placement of the air bubble will be described in connection with the detailed description of the manufacturing method which follows. The barrier created by intimate surface-to-surface contact between the outer body and the air bubble effectively divides the container into two fluid-tight chambers. Each chamber confines a separate constituent, either first constituent 14, 14A, 14B, 14C, 14D, and or second constituent 16, 16A, 16B, 16C, 16D, and 16E.

Absent mechanical perturbation, the viscosity of the liquid crystal composition prevents flow and the constituents will remain separate and unperturbed. It would be essentially impossible to displace the air bubble from between the constituents if there were no other air bubble in the container. If a second, "ballast" air bubble is positioned behind one or both of the constituents, however, it becomes possible to displace air bubble 30, 30A, 30B, 30C, 30D, and 30E to "join" ballast air bubble 32, 32A, 32B, 32C, 32D, and 32E. Following such displacement, constituents 14, 14A, 14B, 14C, 14D and 14E and 16, 16A, 16B, 16C, 16D, and 16E will mix and react. Variations in the design of the container, some of which are shown in FIGS. 1-7, and in the size and position of air bubbles 30, 30A, 30B, 30C, 30D, and 32, 32A, 32B, 32C, 32D, and 32E are possible without affecting the function of the air bubbles as a barrier.

2. The Method of Manufacturing the Container

The steps of manufacturing a container including a barrier of the types discussed above are outlined below.

Turning first to an encapsulating-type barrier, the manufacturing method begins by providing a resilient, sealable (using heat, microwaves, or other common methods of sealing) enclosure which will eventually form outer body 12F. That enclosure is then provided with a predetermined amount of first constituent 14F. First constituent 14F may be directly inserted into or on the enclosure. Alternatively, first constituent 14F may be encapsulated, with a single capsule enclosing all of constituent 14F or numerous microcapsules (as shown in FIG. 7) enclosing portions of constituent 14F, and the capsule or microcapsules then inserted into or on the enclosure. For either alternative, a predetermined amount of second constituent 16F is encapsulated and then inserted into or placed on the enclosure. (Again, a single capsule may enclose all of constituent 16F or numerous microcapsules (as shown in FIG. 7) may enclose portions of constituent 16F.) Finally, with both first and second constituents 14F, 16F inside the enclosure, the enclosure is sealed.

For an air bubble-type barrier, the first manufacturing step also involves providing a resilient, sealable enclosure which will eventually form outer body 12, 12A, 12B, 12C, 12D, and The enclosure may be continuously extruded into the interior of an axially-segmented mold which is divided into two opposed mold halves. Thus, the enclosure, as provided, can be separated into a lower half and an upper half. A predetermined amount of first constituent 14, 14A, 14B, 14C, 14D, and 14E is placed on the lower half of the enclosure at a specified position thereon. A predetermined amount of second constituent 16, 16A, 16B, 16C, 16D, and is also placed on the lower half of the enclosure, at a specified distance from first constituent 14, 14A, 14B, 14C, 14D, and 14E.

The two reactive liquid crystal constituents, which combine to form the liquid crystal composition of the cumulative liquid crystal dosimeter, are relatively viscous; they will now flow absent perturbation. Accordingly, placement of the constituents on the lower half of the enclosure will define the size and placement of air bubble 30, 30A, 30B, 30C, 30D, and 30E and ballast air bubble 32, 32A, 32B, 32C, 32D, and 32E. Although at least one ballast air bubble is required, more may be provided. A ballast air bubble is placed behind one or both of the constituents, on the side of the constituent opposite the interface between the constituents. Otherwise, as FIGS. 1–6 show, placement of the air bubbles 30, 30A, 30B, 30C, 30D and 30E, 32, 32A, 32B, 32C, 32D, and 32E may be accomplished in a number of configurations.

Air bubble 30, 30A, 30B, 30C, 30D, and 30E and ballast air bubble 32, 32A, 32B, 32C, 32D, and 32E are formed by covering the lower half of the enclosure with its upper half, then sealing the two halves together to form a leak-tight seal. Heat sealing is suitable.

3. The Process of Using the Container

Using the container of the present invention, in the embodiments of that container disclosed above, one may monitor the accumulated thermal exposure of perishable goods. The first step which must be performed, when using either of the embodiments, is to select a container which confines a liquid crystal composition—including a first constituent and a second constituent—whose indicator reaction is compatible with the useful shelf life of the goods to be monitored. It would be senseless to select a container whose liquid crystal composition reacts between −25° C. and 0° C., for example, if the goods require monitoring between 0° C. and +25° C. The container and goods would be incompatible.

Once the appropriate container is selected, that container must be affixed to the goods. As discussed above, the container may be affixed to, or mounted on, the surface of the goods. Conventional mounting devices, such as clips, pins, tapes, adhesives, and the like, are suitable to affix the container to the goods.

Once the container is affixed to the goods, the indicator reaction between the liquid crystal composition constituents must be activated. (It is also possible, however, to accomplish the steps of affixing the container and activating the indicator reaction contemporaneously.) The process of activating that reaction will depend upon which type of barrier the container incorporates. Turning first to an encapsulating-type barrier, the capsule (or microcapsules, if both constituents 14F and 16F are encapsulated or if multiple microcapsules are used to encapsulate only second constituent 16F) must be broken so that the constituents can mix and react. That may be accomplished by applying mechanical pressure to the container sufficient to break the capsule or microcapsules but insufficient to harm container 10F.

For the air bubble-type barrier, activation occurs by displacing air bubble 30, 30A, 30B, 30C, 30D, and 30E between first constituent 14, 14A, 14B, 14C, 14D and 14E and second constituent 16, 16A, 16B, 16C, 16D, and 16E. Such displacement may be accomplished mechanically, for example, by applying a roller to container 10, 10A, 10B, 10C, 10D, and 10E. It can also be accomplished thermally. The container is normally stored at room temperature. By sharply cooling one side of the container, ballast bubble 32, 32A, 32B, 32C, 32D, and 32E will compress and air bubble 30, 30A, 30B, 30C, 30D, and 30E will displace until it merges with, or joins, the ballast bubble. Absent an intervening air bubble 30, 30A, 30B, 30C, 30D, and 30E, constituents 14, 14A, 14B, 14C, 14D, and 14E and 16, 16A, 16B, 16C, 16D, and will mix and react.

Following activation, for either the encapsulating or air bubble-type barrier, the container may be kneaded to create homogeneous mixing of the constituents. Alternatively, the indicator reaction may be allowed to proceed at the interface, created by removal of the barrier, between the two constituents. That alternative may prove advantageous if, for example, a red color emerges at the interface of a blue cholesteric solvent as a function of time and temperature. The color contrast observed can be striking. Moreover, the observer can judge the extent of spreading of the color as a criterion for the integral of time and temperature—in addition to the color itself.

Subsequently, container 10, 10A, 10B, 10C, 10D, 10E, and 10F must be monitored to observe the indicator reaction. As stated above, the process of monitoring is facilitated by transparent section 20, reflective section 22, and color indicator 24 on outer body 12B of container 10B. Reflective section 22 provides a backdrop highlighting the color of the liquid crystal composition inside container 10B. The color of the composition is observed through transparent section 20. Then, the observed color is compared to color indicator 24 to evaluate the thermal dosage accumulated by the goods.

Although the invention is illustrated and described herein as embodied in a container for a liquid crystal cumulative dosimeter which has an outer body sealed to contain a cholesteric liquid crystal composition with one or more of the constituents of the composition adapted to enter into a chemical reaction; at least one transparent section in the body to permit observation of the color change which occurs in proportion to the degree of completeness of the reaction; and a barrier contained completely within, but physically unattached to, the outer body to separate the reactants within the container while the dosimeter is stored and to allow the reactants to mix upon disruption of the barrier, the invention is nevertheless not intended to be limited to the details shown. Rather, various modifications may be made in the details within the scope and range of equivalents of the claims and without departing from the spirit of the invention.

What is claimed is:

1. A process of monitoring an accumulated thermal exposure of perishable goods, using a container for a liquid crystal cumulative dosimeter including a first liquid crystal composition constituent and a second liquid crystal composition constituent adapted when mixed to react chemically and to change color in response to said reaction and in proportion to the cumulative time and temperature exposure of said constituents, said container having (a) a resilient outer body sealed to confine said first liquid crystal composition constituent and said second liquid crystal composition constituent and having at least one transparent section to permit observation of the color of the confined composition formed when said two constituents are allowed to mix and (b) barrier means contained completely within and physically unattached to said outer body for separating said first liquid crystal constituent from said second liquid crystal constituent, said barrier means including at least one capsule for enclosing one of said first or said second liquid crystal constituents, whereby the application of modest mechanical pressure breaks said capsule and allows said first liquid crystal constituent to mix with said second liquid crystal constituent, said process comprising the steps of:

(a) selecting a container confining a first liquid crystal composition constituent and a second liquid crystal composition constituent whose indicator reaction is compatible with the useful shelf life of said perishable goods;

(b) affixing the selected container to said perishable goods;

(c) activating the said indicator reaction in said container by mechanically breaking the capsule enclosing one of said first or said second liquid crystal constituents, whereby said first and second liquid crystal constituents mix;

(d) monitoring the container for the activated indicator reaction.

2. A process according to claim 1 further comprising, after the step of activating the indicator reaction and before the step of monitoring the container for the activated indicator reaction, the step of kneading the container to create a homogeneous mixing of the liquid crystal constituents.

3. A process according to claim 1 wherein the step of activating the indicator reaction occurs contemporaneously with the step of affixing the container to said perishable goods.

4. A process of monitoring an accumulated thermal exposure of perishable goods, using a container for a liquid crystal cumulative dosimeter including a first liquid crystal composition constituent and a second liquid crystal composition constituent adapted when mixed to react chemically and to change color in response to said reaction and in proportion to the cumulative time and temperature exposure of said constituents, said container having (a) a resilient outer body sealed to confine said first liquid crystal composition constituent and said second liquid crystal composition constituent and having at least one transparent section to permit observation of the color of the confined composition formed when said two constituents are allowed to mix and (b) barrier means contained completely within and physically unattached to said outer body for separating said first liquid crystal constituent from said second liquid crystal constituent, said barrier means including at least one capsule for enclosing said first liquid crystal constituent and at least one capsule for enclosing said second liquid crystal constituent, whereby the application of modest mechanical pressure breaks said capsules and allows said first liquid crystal constituent to mix with said second liquid crystal constituent, said process comprising the steps of:

(a) selecting a container confining a first liquid crystal composition constituent and a second liquid crystal composition constituent whose indicator reaction is compatible with the useful shelf life of said perishable goods;

(b) affixing the selected container to said perishable goods;

(c) activating the said indicator reaction in said container by mechanically breaking the capsules enclosing said first and said second liquid crystal constituents, whereby said first and second liquid crystal constituents mix;

(d) monitoring the container for the activated indicator reaction.

5. A process according to claim 4 further comprising, after the step of activating the indicator reaction and before the step of monitoring the container for the activated indicator reaction, the step of kneading the container to create a homogeneous mixing of the liquid crystal constituents.

6. A process according to claim 4 wherein the step of activating the indicator reaction occurs contemporaneously with the step of affixing the container to said perishable goods.

7. A process of monitoring an accumulated thermal exposure of perishable goods, using a container for a liquid crystal cumulative dosimeter including a first liquid crystal composition constituent and a second liquid crystal composition constituent adapted when mixed to react chemically and to change color in response to said reaction and in proportion to the cumulative time and temperature exposure of said constituents, said container having (a) a resilient outer body sealed to confine said first liquid crystal composition constituent and said second liquid crystal composition constituent and having at least one transparent section to permit observation of the color of the confined composition formed when said two constituents are allowed to mix and (b) barrier means contained completely within and physically unattached to said outer body for separating said first liquid crystal constituent from said second liquid crystal constituent, said barrier means including an air bubble disposed between said first and said second liquid crystal constituents and a ballast air bubble disposed behind one of said first or said second liquid crystal constituents, whereby disruption of said barrier means allows said first liquid crystal constituent to mix with said second liquid crystal constituent, said process comprising the steps of:

(a) selecting a container confining a first liquid crystal composition constituent and a second liquid crystal composition constituent whose indicator reaction is compatible with the useful shelf life of said perishable goods;

(b) affixing the selected container to said perishable goods;

(c) activating the said indicator reaction in said container by displacing the air bubble disposed between said first and said second liquid crystal constituents, whereby said first and second liquid crystal constituents mix;

(d) monitoring the container for the activated indicator reaction.

8. A process according to claim 7 wherein said air bubble is mechanically displaced.

9. A process according to claim 7 wherein said air bubble is thermally displaced.

10. A process according to claim 7 further comprising, after the step of activating the indicator reaction and before the step of monitoring the container for the activated indicator reaction, the step of kneading the container to create a homogeneous mixing of the liquid crystal constituents.

11. A process according to claim 7 wherein the step of activating the indicator reaction occurs contemporaneously with the step of affixing the container to said perishable goods.

* * * * *